(12) United States Patent
Tsuda et al.

(10) Patent No.: US 7,731,296 B2
(45) Date of Patent: Jun. 8, 2010

(54) VEHICLE SEAT HAVING BUCKLE HOLDING STRUCTURE

(75) Inventors: Toshihiko Tsuda, Shioya-gun (JP); Takahiro Ito, Tsu (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 12/283,024

(22) Filed: Sep. 9, 2008

(65) Prior Publication Data
US 2009/0072607 A1 Mar. 19, 2009

(30) Foreign Application Priority Data
Sep. 13, 2007 (JP) .............................. 2007-237879

(51) Int. Cl.
*A47C 31/00* (2006.01)
*B60N 2/44* (2006.01)
(52) U.S. Cl. .................... 297/482; 297/331; 297/463.1; 280/801.1
(58) Field of Classification Search ................. 297/482, 297/331, 228.1, 229, 463.1, 463.2; 280/801.1
See application file for complete search history.

(56) References Cited

U.S. PATENT DOCUMENTS 4,133,556 A * 1/1979 Glinski .................... 280/801.1

7,104,570 B2 * 9/2006 Hearn et al. ............. 280/801.1

FOREIGN PATENT DOCUMENTS

| JP | 63028750 A | * | 2/1988 |
| JP | 08-301070 | | 11/1996 |
| JP | 2002-362309 | | 12/2002 |
| JP | 2005-255089 | | 9/2005 |

* cited by examiner

*Primary Examiner*—Anthony D Barfield
(74) *Attorney, Agent, or Firm*—Carrier, Blackman & Associates P.C.; Joseph P. Carrier; William D. Blackman

(57) ABSTRACT

A buckle holding structure for holding a buckle unit on a seat cushion, the buckle unit having: a belt of which one end is fixed to a vehicle body; and a buckle fixed to the other end of the belt, the buckle holding structure including: a band that has elasticity, has a predetermined width, and is folded in a U shape to form a folded portion, wherein both ends of the band are fixed to a rear end of the seat cushion so as to be disposed on the same plane in a width direction of the band; the belt of the buckle unit is inserted into a gap formed between both ends of the band, which is fixed to the rear end of the seat cushion, and the folded portion; and the buckle is caught by the folded portion.

9 Claims, 8 Drawing Sheets

VEHICLE SEAT HAVING BUCKLE HOLDING STRUCTURE

Priority is claimed on Japanese Patent Application No. 2007-237879, filed Sep. 13, 2007, the content of which is incorporated herein by reference.

BACKGROUND OF THE INVENTION

1. Field of the Invention

The present invention relates to a buckle holding structure for a vehicle and a vehicle seat having the buckle holding structure.

2. Description of Related Art

There has been a seat belt device for a vehicle that restrains an occupant in a seat by engaging a tongue of a seat belt, which is stretched over an occupant's body, with a buckle of a buckle unit fixed to a vehicle body. Since the buckle unit is subject to a large impact during the collision, the buckle unit is fixed to the vehicle body. For example, one end of the belt is fixed to the vehicle body, and the buckle is fixed to the other end of the belt. If the buckle cannot be directly found when an occupant intends to fasten a seat belt, it is inconvenient to use the seat belt device.

Accordingly, there has been considered a buckle holding structure where a buckle always exists in place when the seat belt is not fastened.

For example, in a buckle holding structure disclosed in Japanese Unexamined Patent Application, First Publication No. 2002-362309, an annular band formed of a rubber band is fixed to a rear portion of an upper surface of a seat cushion, and a belt and a buckle of a buckle unit are caught by the annular band. The buckle unit is inserted into the annular band of which the diameter is increased against the elasticity of the annular band, and the annular band is then elastically contracted, so that the belt and the buckle of the buckle unit are caught by the annular band. Further, the buckle holding structure is provided in a movable seat cushion that can be flipped so as to overlap a seat back or drop on a vehicle floor positioned below feet. Accordingly, when the seat cushion is moved, the annular band formed of a rubber band is elongated and catches the buckle.

However, in the buckle holding structure in the above described conventional art, the annular band is mounted on the rear portion of the upper surface of the seat cushion so that the buckle certainly returns to the upper surface of the seat cushion when the seat cushion returns to a seating position. For this reason, there has been a demand for an improvement of appearance because the annular band is exposed to a seating surface of the seat cushion.

Consequently, the present invention has an object of providing a buckle holding structure that has good appearance and can reliably return a buckle to a seat cushion, and a vehicle seat having the buckle holding structure.

SUMMARY OF THE INVENTION

In order to achieve the above described object, the present invention employs the followings.

Namely, the present invention employs a buckle holding structure for holding a buckle unit on a seat cushion, the buckle unit having: a belt of which one end is fixed to a vehicle body; and a buckle fixed to the other end of the belt, the buckle holding structure including: a band that has elasticity, has a predetermined width, and is folded in a U shape to form a folded portion, wherein both ends of the band are fixed to a rear end of the seat cushion so as to be disposed on the same plane in a width direction of the band; the belt of the buckle unit is inserted into a gap formed between both ends of the band, which is fixed to the rear end of the seat cushion, and the folded portion; and the buckle is caught by the folded portion.

According to the above described buckle holding structure, since the band is fixed to the rear end of the seat cushion, the band is not exposed to the seating surface of the seat cushion and thereby the appearance is good. Further, since the buckle is caught by the folded portion of the band, the buckle does not come off. In addition, since both ends of the band are fixed to the rear end of the seat cushion so as to be disposed in the width direction of the band, the width of a portion where the bands are extended in parallel with each other is increased. This portion where the bands are extended in parallel with each other becomes a receiving surface of the buckle when the buckle is lifted onto the seat cushion. Therefore, it is possible to reliably guide the buckle onto the seat cushion.

It may be arranged such that the buckle holding structure further includes a tongue piece that has elasticity and has a width larger than the width of the band, wherein both ends of the band are fixed to the rear end of the seat cushion with the tongue piece interposed therebetween.

In this case, since the tongue piece of the seat cushion functions as the receiving surface of the buckle, it is possible to reliably guide the buckle onto the seat cushion.

It may be arranged such that one end of the tongue piece is sewn with both a surface skin and a bottom skin of the seat cushion.

It may be arranged such that both ends of the band and one end of the tongue piece is sewn with both a surface skin and a bottom skin of the seat cushion.

It may be arranged such that a cloth having no elasticity is sewn on the surface of the band.

In addition, the present invention also employs a vehicle seat having a buckle holding structure for holding a buckle unit, the buckle unit having: a belt of which one end is fixed to a vehicle body; and a buckle fixed to the other end of the belt, the vehicle seat including: a seat cushion; a seat back; a rotary arm with which the seat cushion is rotatably connected to the seat back, the seat cushion being rotatable in a process of transferring between a seatable state and a tip-up state where the seat cushion rotates upward from the seatable state and overlaps the seat back being in a upright position; and an elastic band folded in a U shape to form a folded portion with both ends thereof being fixed to a rear end of the seat cushion to form a gap therebetween, the buckle unit being inserted into the gap, wherein the buckle is held at the folded portion when the seat cushion is in the tip-up state; and the elastic band draws the buckle onto the seat cushion in a process of transferring from the tip-up state to the seatable state.

According to the above-described vehicle seat, since the elastic bands draws the buckle onto the seat cushion in a process of transferring from the tip-up state to the seatable state, it is possible to reliably guide the buckle onto the seat cushion in the process of the transferring of the vehicle seat.

It may be arranged such that the vehicle seat further includes a receiving surface which receives the buckle and is arranged between the rear end of the seat cushion and the folded portion.

It may be arranged such that the receiving surface is formed by disposing both ends of the elastic band on the same plane in the width direction thereof, the elastic band having a predetermined width.

It may be arranged such that the vehicle seat, further includes a non elastic cloth which is fixed to the rear end of the seat cushion, with which the receiving surface is formed.

DETAILED DESCRIPTION OF THE INVENTION

A buckle holding structure according to an embodiment of the present invention will be described below with reference to FIGS. 1 to 10. Note that, in the following description, an upward and downward direction indicates the upward and the downward direction of a vehicle body, a forward and backward direction indicates the forward and the backward direction of the vehicle body, and a left and right direction indicates the left and the right direction that corresponds to a vehicle width direction as seen from a driver's seat.

Figure 1:
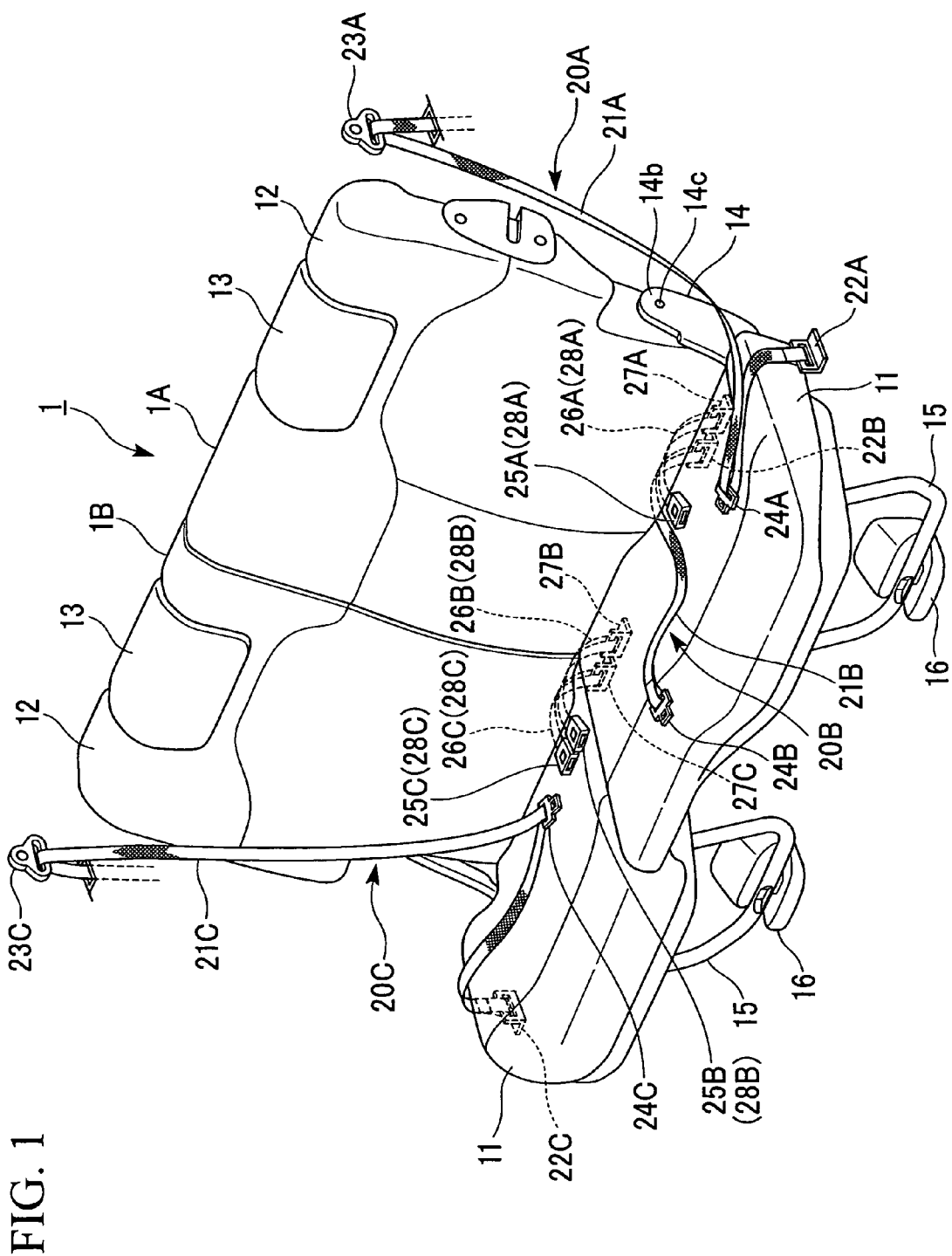
FIG. 1 is a perspective view showing the appearance of a rear seat of a vehicle that is provided with a buckle holding structure according to an embodiment of the present invention.

FIG. 1 is a perspective view showing the appearance of a rear seat 1 of a vehicle. The rear seat 1 is divided into two pieces at a predetermined ratio (for example, 7:3 or 6:4) so as to be composed of a left rear seat 1A having a larger width and a right rear seat 1B having a smaller width.

The structure common to the rear seats 1A and 1B will be described first. Each of the rear seats 1A and 1B includes a seat cushion 11 that supports occupant's hips, a seat back 12 that supports an occupant' back, and a headrest 13 that supports an occupant's head.

Figure 2:
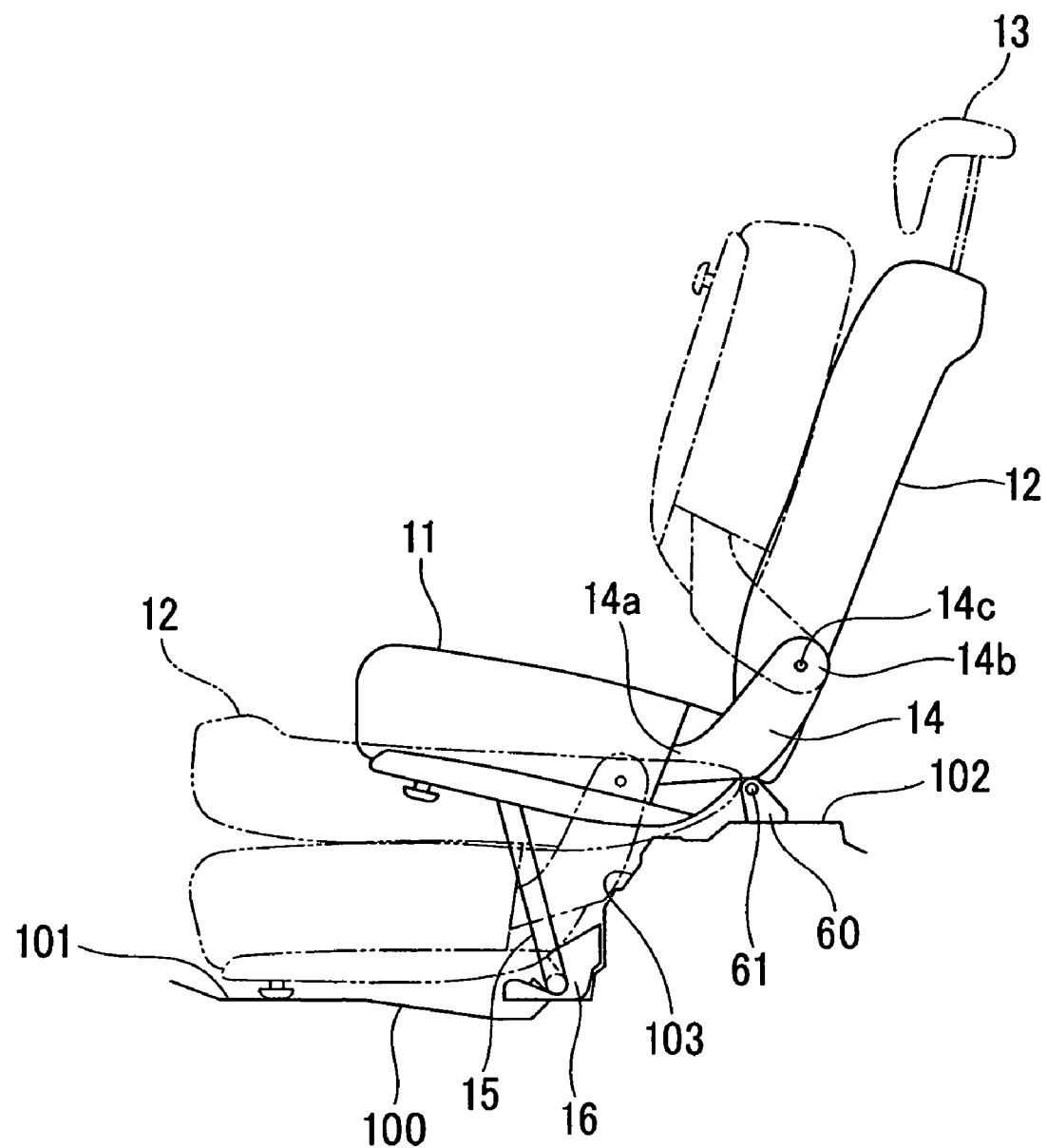
FIG. 2 is a side view illustrating the seat arrangement of the rear seat.

As shown in FIG. 2, the rear seats 1A and 1B are disposed in the vicinity of a stepped floor 103 where a front lower floor 101 of a vehicle body floor 100 is connected to a rear upper floor 102 of the vehicle body floor 100, the rear upper floor 102 being higher than the lower floor 101. In this case, the lower floor 101 may be referred to as a vehicle body floor of the rear seats 1A and 1B that are positioned below occupants' feet.

A lower end of the seat back 12 is rotatably mounted on a base 60 by a pivot 61, the base 60 being positioned in the vicinity of a front end of the upper floor 102. Further, the seat back 12 can be held at a upright position where the seat back is slightly inclined backward as shown in FIG. 2 with a solid line, by a support mechanism (not shown). Furthermore, the seat back can be rotated forward about the pivot 61 so as to fall forward as shown in FIG. 2 with a two-dot dashed line.

The seat cushion 11 is rotatably provided at the seat back 12 by a rotary arm 14. Specifically, one end 14a of a substantially L-shaped rotary arm 14 is fixed to the seat cushion 11, while the other end 14b of the rotary arm 14 is mounted to the seat back so as to be rotatable about a pivot 14c that is provided at the lower portion of the seat back 12.

As shown in FIG. 1, a stand leg 15 is provided on the bottom of the seat cushion 11, the stand leg 15 supporting the seat cushion 11 on the vehicle body floor 100. The stand leg 15 has a substantially U shape of which an upper portion is opened, and the upper portion of the stand leg 15 is rotatably supported by the frame of the seat cushion 11. As shown in FIG. 2, by making the stand leg 15 stand on the seat cushion 11, the stand leg 15 can support the seat cushion 11 on the vehicle body floor 100 so as to hold the seat cushion at the attitude shown in FIG. 2 by a solid line. Hereinafter, this state is referred to as a seatable state. Meanwhile, a leg receiving member 16 which receives the lower end of the stand leg 15 when the seat cushion 11 is in the seatable state is provided at a connection portion between the lower floor 101 and the stepped floor 103.

If the seat cushion 11 is rotated upward from the seatable state, the seat cushion 11 can overlap the seat back 12 that is in the standing attitude as shown in FIG. 2 by a one-dot dashed line. Hereinafter, this state is referred to as a tip-up state. When the seat cushion 11 is in the tip-up state, the space on the lower floor 101 is increased as much as the seat cushion 11 is withdrawn upward and backward, so that it is possible to load tall baggage in the space. Meanwhile, if the stand leg 15 is rotated downward to be withdrawn when the seat cushion 11 is in the tip-up state, it is possible to further increase the space on the lower floor 101. In addition, the stand leg 15 is rotated downward and is stored on the bottom of the seat cushion 11, so that the tip-up state is maintained by a lock mechanism (not shown).

Further, if the seat back 12 is rotated forward about the pivot 61, the rear seats 1A and 1B in the tip-up state can drop on the lower floor 101 as shown in FIG. 2 with a two-dot dashed line while the seat back 12 overlap the seat cushion 11. Hereinafter, this state is referred to as a dive-down state.

Furthermore, if the seat back 12 is rotated forward about the pivot 61, in which the seat cushion 11 and the seat back 12 are in the seatable state, the seat cushion 11 is moved forward while being relatively rotated forward about the pivot 14c with the forward rotation of the seat back 12. Accordingly, the stand leg 15 of the seat cushion 11 is rotated forward about a portion that is supported by the leg receiving member 16, and then folded. As a result, the seat cushion 11 drops on the lower floor 101, in which the seat cushion 11 and the seat back 12 overlap each other, and thereby the dive-down state is achieved.

That is, the rear seats 1A and 1B are seats for a vehicle that can be transformed into three kinds of seat arrangements, that is, the seatable state where an occupant can be seated, the tip-up state where the seat cushion 11 overlaps the seat back 12 being in the upright position, and the dive-down state where the seat cushion 11 and the seat back 12 overlap each other and drop on the vehicle body floor positioned below occupants' feet (lower floor 101).

The headrest 13 in the rear seat 1A is disposed at a position that is slightly off-centered to the left side of the seat back 12 in the left and right direction, while the headrest 13 in the rear seat 1B is disposed at substantially the middle portion of the seat back 12 in the left and right direction. Further, the headrests 13 provided on the seat backs 12 can move up and down.

As shown in FIG. 1, the rear seat 1 is provided with three sets of seat belt devices 20A, 20B, and 20C. The seat belt device 20A restrains an occupant seated on the left portion of the rear seat 1A, the seat belt device 20B restrains an occupant seated on the right portion of the rear seat 1A (in other words, the middle of the rear seat 1), and the seat belt device 20C restrains an occupant seated in the rear seat 1B.

The seat belt device 20A is a so-called three-point seat belt device. One end of a long seat belt 21A is fixed to the side portion of the vehicle body by an outer anchor 22A, and the other end of the seat belt 21A is inserted into a through anchor 23A and connected to a winding device (not shown). Further, the seat belt 21A is inserted into a tongue 24A between the outer anchor 22A and the through anchor 23A. A buckle 25A, which can be engaged with and disengaged from the tongue 24A, is fixed to one end of a short anchor belt 26A. The other end of the anchor belt 26A is fixed to the vehicle body floor by an anchor 27A. In this embodiment, the buckle 25A and the anchor belt 26A configure a buckle unit 28A. In the seat belt device 20A, the seat belt 21A is stretched over the waist and the upper body of the seated occupant, and the tongue 24A is engaged with the buckle 25A, so that the occupant can be restrained in the rear seat 1A. If the tongue 24A is disengaged from the buckle 25A, the occupant may get into an unrestrained state.

The seat belt device 20C is disposed so as to be symmetrical with the seat belt device 20A with respect to the vehicle body, and has the same structure as the seat belt device 20A. The seat belt device 20C includes a seat belt 21C, an outer anchor 22C, a through anchor 23C, a tongue 24C, a buckle 25C, an anchor belt 26C, and an anchor 27C.

The seat belt device 20B is a so-called two-point seat belt device. One end of a long seat belt 21B is fixed to the vehicle body floor by an anchor 22B, and a tongue 24B is connected to the other end of the seat belt 21B. A buckle 25B, which can be engaged with and disengaged from the tongue 24B, is fixed to one end of a short anchor belt 26B. The other end of the anchor belt 26B is fixed to the vehicle body floor by an anchor 27B. In this embodiment, the buckle 25B and the anchor belt 26B configure a buckle unit 28B. In the seat belt device 20B, the seat belt 21B is stretched over the waist of the seated occupant, and the tongue 24B is engaged with the buckle 25B, so that the occupant is restrained in the rear seat 1A. If the tongue 24B is disengaged from the buckle 25B, the occupant may get into an unrestrained state.

Figure 3:
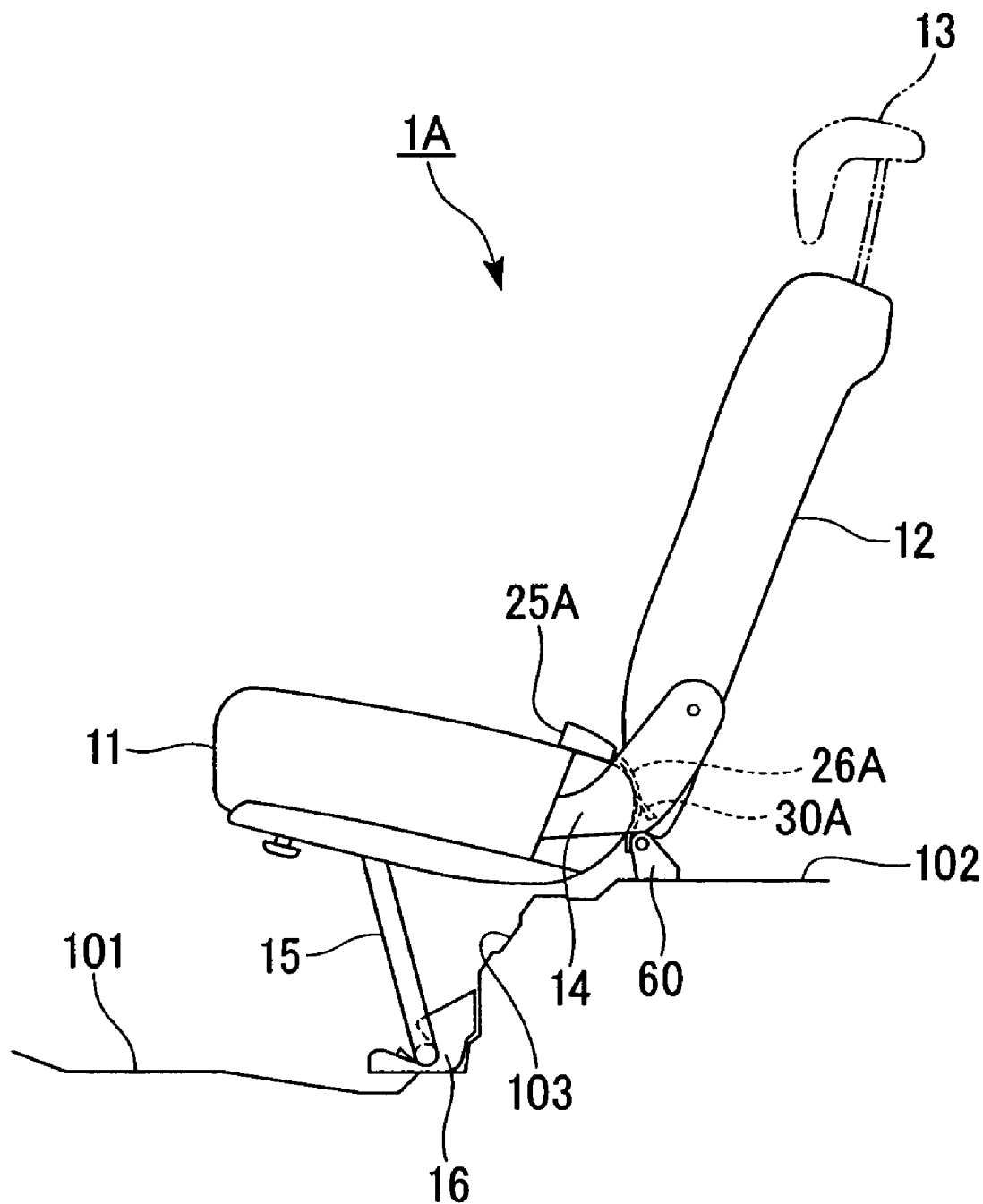
FIG. 3 is a side view of the rear seat showing a mounted buckle holder.

When the rear seat 1A is in the seatable state as shown in FIG. 3, the anchor belt 26A of the seat belt device 20A is drawn onto the seat cushion 11 through a gap between the seat cushion 11 and the seat back 12 in substantially the middle of the rear seat 1A in the left and right direction, and the buckle 25A is placed on the seat cushion 11. Meanwhile, the same is true in arrangements of the seat belt 21B and the tongue 24B of the seat belt device 20B as described above.

Further, when the rear seat 1B is in the seatable state, the anchor belts 26B and 26C of the seat belt devices 20B and 20C are drawn onto the seat cushion 11 through a gap between the seat cushion 11 and the seat back 12 of the rear seat 1B, and the buckles 25B and 25C are placed on the seat cushion 11.

Figure 4:
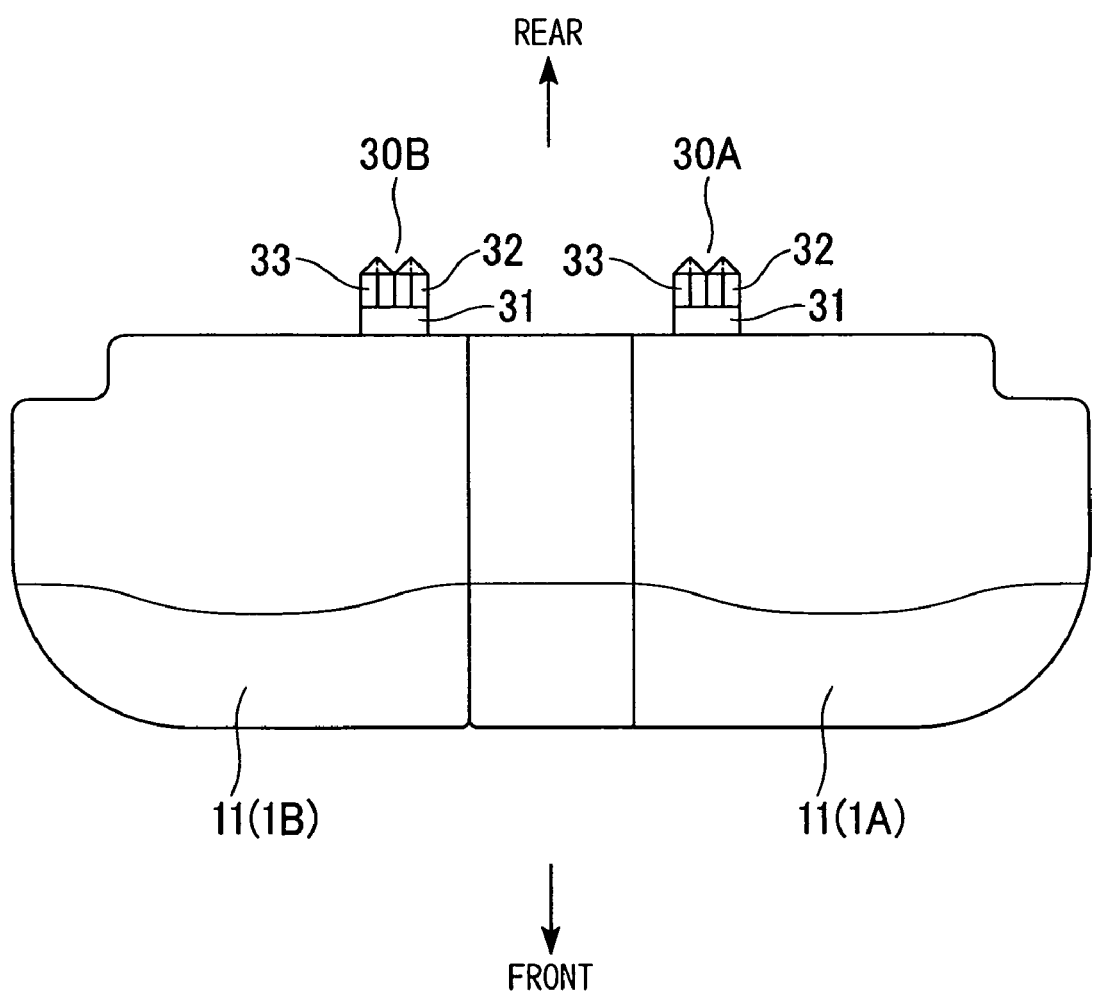
FIG. 4 is a plan view of seat cushions showing the disposition of the buckle holders.

FIG. 4 is a plan view of the seat cushions 11 and 11 of the rear seats 1A and 1B. The seat cushions 11 and 11 of the rear seats 1A and 1B are provided with buckle holders 30A and 30B. As shown in FIG. 4, the buckle holder 30A is attached to a rear end of the seat cushion 11 of the rear seat 1A in substantially the middle of the seat cushion in the left and right direction. The buckle holder 30B is attached in the vicinity of the right rear end of the seat cushion 11 of the rear seat 1B. Note that, for convenience, the buckle holders 30A and 30B are omitted in FIG. 1.

Figure 5:
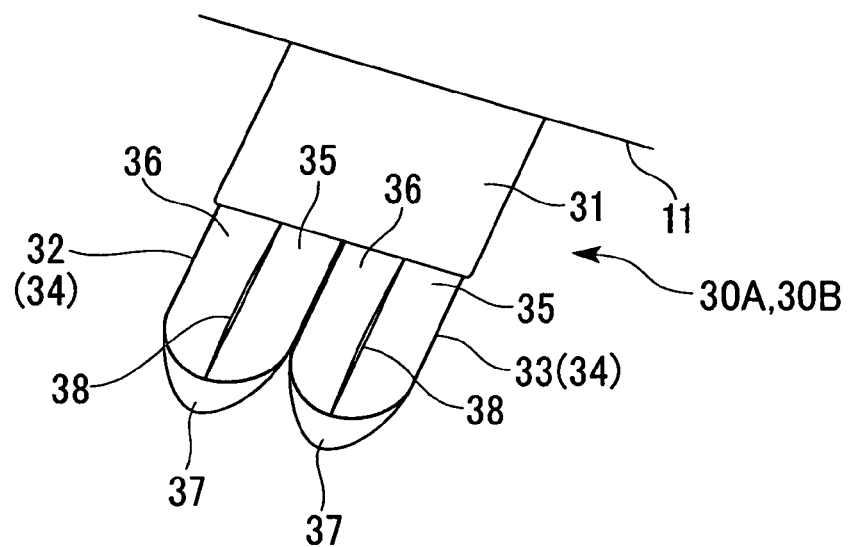
FIG. 5 is a perspective view of the buckle holder.

As shown in FIG. 5, the buckle holders 30A and 30B includes tongue pieces 31 and a pair of U bands 32 and 33.

Figure 6:
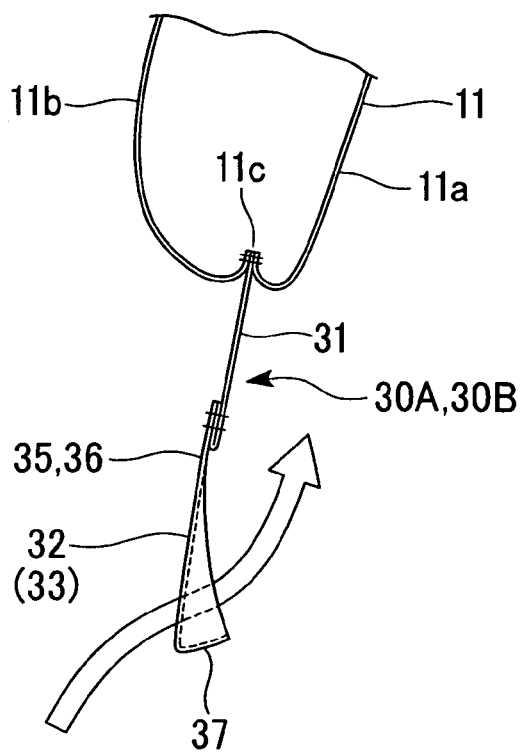
FIG. 6 is a side view of the buckle holder.

The tongue piece 31 is made of a material, which has flexibility, and has elasticity in the longitudinal direction (for example, a rubber band), and is formed in the shape of a belt having a large width. As shown in FIG. 6, the tongue piece 31 is fixed to the rear end of the seat cushion 11 so that one end of the tongue piece 31 is sewn on the suture 11c between a surface skin 11a and a bottom skin 11b. Meanwhile, FIG. 6 shows the rear end of the seat cushion 11 that is in the tip-up state.

Figure 7:
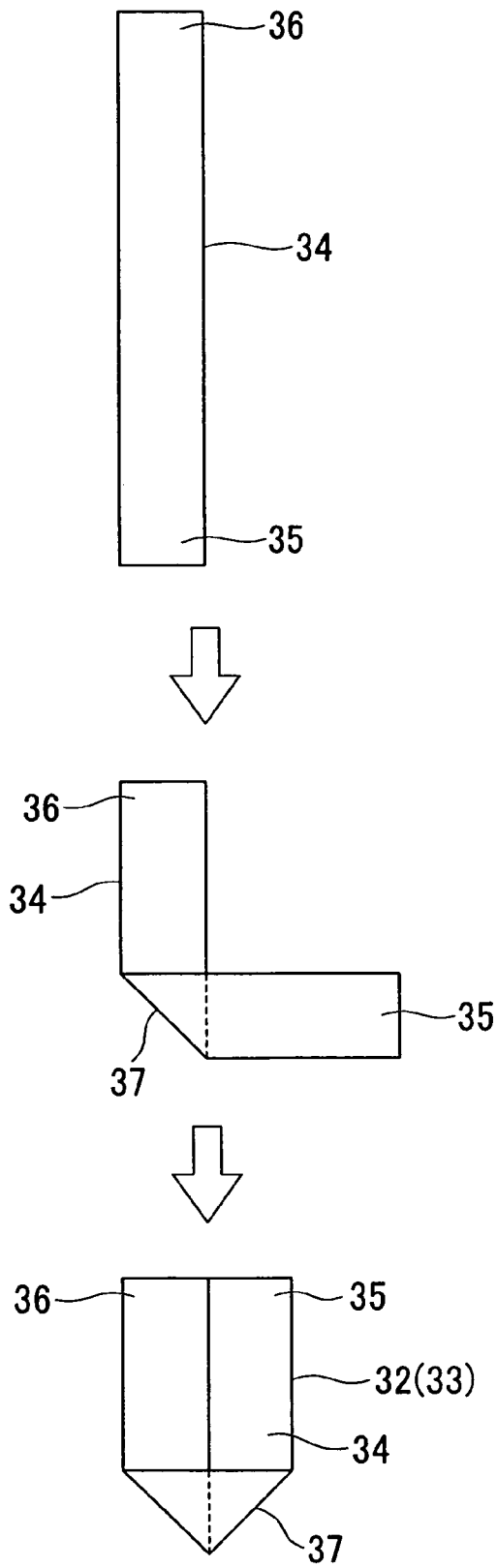
FIG. 7 is a view schematically illustrating the manufacturing procedure of a U band of the buckle holder.

Each of the U bands 32 and 33 is made of a material, which has flexibility and has elasticity in the longitudinal direction (for example, a rubber band). As for the U bands 32 and 33, one band 34 having a predetermined width is folded (turns in a U shape) at substantially the middle thereof in the longitudinal direction without being twisted, and both ends 35 and 36 of the band 34 in the longitudinal direction are disposed on the same plane in a width direction of the band 34. That is, each of the U bands 32 and 33 is formed to have a folded portion 37 at substantially the middle of the band 34 in the longitudinal direction. Meanwhile, FIG. 7 schematically illustrates a method of folding the band 34.

Both ends 35 and 36 of the U band 32 and both ends 35 and 36 of the U band 33 are disposed on the same plane in the width direction of the band 34, and the ends 35 and 36 are sewn on the tongue piece 31 while overlapping the back surface of the end of the tongue piece 31. Accordingly, the width of the tongue piece 31 is four times as large as the width of each of the U bands 32 and 33. A gap 38 into which the buckle can be inserted is formed at each of the U bands 32 and 33 that are attached to the tongue piece 31 in this way.

The buckle unit 28A of the seat belt device 20A and the seat belt 21B of the seat belt device 20B are engaged with the buckle holder 30A having the above-mentioned structure. Meanwhile, the buckle units 28B and 28C of the seat belt devices 20B and 20C are engaged with the buckle holder 30B.

Specifically, the anchor belt 26A of the seat belt device 20A is inserted into the gap 38 of the left U band 32 of the buckle holder 30A, so that the buckle 25A can be caught by the folded portion 37.

The seat belt 21B of the seat belt device 20B is inserted into the gap 38 of the right U band 33 of the buckle holder 30A.

The anchor belt 26B of the seat belt device 20B is inserted into the gap 38 of the left U band 32 of the buckle holder 30B, so that the buckle 25B can be caught by the folded portion 37.

The anchor belt 26C of the seat belt device 20C is inserted into the gap 38 of the right U band 33 of the buckle holder 30B, so that the buckle 25C can be caught by the folded portion 37.

In a method of mounting the buckle 25A and the anchor belt 26A to the U band 32 of the buckle holder 30A, the buckle 25A and the anchor belt 26A are inserted into the gap 38 of the U band 32 from the back surface to the front surface as shown in FIG. 6 with an arrow. In this case, the length of the U band 32 is set so that the buckle 25A can be inserted into the gap 38 if the gap 38 is expanded against the elasticity of the U band 32 while the buckle 25A cannot be inserted into the gap 38 if the gap 38 is not expanded. A method of mounting other members to the other U band is the same as described above.

Next, the function of the buckle holders 30A and 30B having the above-mentioned structure will be described. Especially the function of the buckle holders will be described herein using the buckle unit 28A of the seat belt device 20A, which is engaged with the U band 32 of the buckle holder 30A with reference to FIGS. 3 and 8.

When the rear seat 1A is in the seatable state as shown in FIG. 3, the anchor belt 26A of the seat belt device 20A is drawn onto the seat cushion 11 through a gap between the seat cushion 11 and the seat back 12, and the buckle 25A is placed on the seat cushion 1l. In this case, since the tongue piece 31 and the U bands 32 and 33 of the buckle holder 30A are positioned at the rear of the rear end of the seat cushion 11, the tongue piece and the U bands are not drawn onto the seat cushion 11. Therefore, the tongue piece and the U bands are not visually recognized to an occupant, and thereby the appearance is good.

Further, the buckle 25A is always placed on the seat cushion 11 in the seatable state. Accordingly, when using the seat belt device 20A, an occupant can directly recognize the buckle 25A. For this reason, it is possible to easily use the seat belt device 20A.

Figure 8:
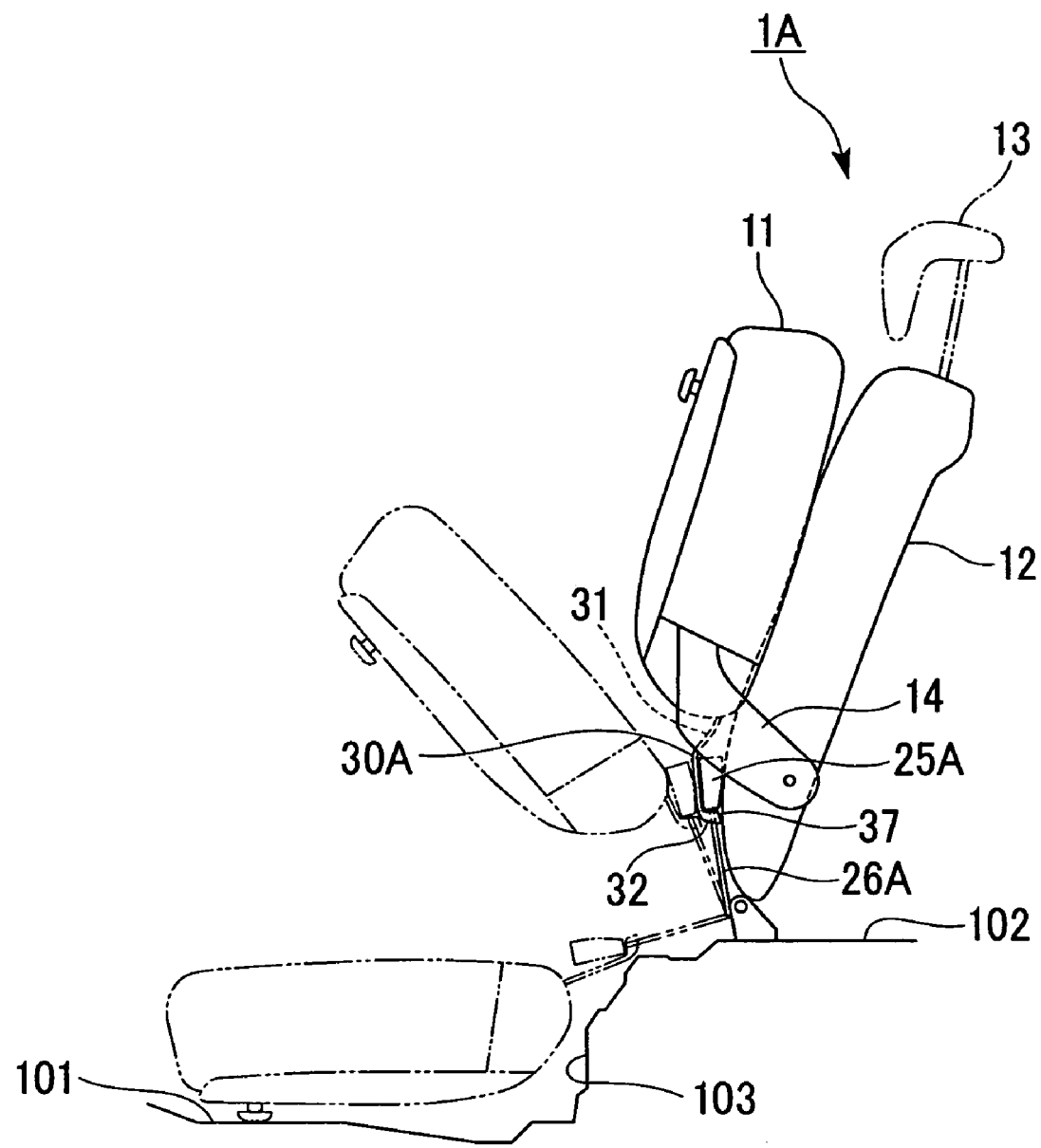
FIG. 8 is a view illustrating the function of the buckle holder.

Then, if the seat cushion 11 is rotated upward so that the state of the seat is changed from the seatable state to the tip-up state, the distance between the anchor 27A fixing the anchor belt 26A to the vehicle body and the rear end of the seat cushion 11 is gradually increased. If the anchor belt 26A extends in the form of a straight line and the buckle holder 30A forms a straight line while the seat cushion 11 is rotated upward as shown in FIG. 8, the buckle 25A is caught by the folded portion 37 of the U band 32. After that, the tongue piece 31 and the U band 32 of the buckle holder 30A are elongated against the elasticity of the tongue piece 31 and the U band 32 while the buckle 25A is caught by the folded portion 37, so that the seat achieves the tip-up state. During this period, the bands 34 and 34 of the U band 32 which are extended in parallel with each other are elongated, so that the widths of the bands are decreased. However, since the buckle 25A is caught by the folded portion 37, the buckle 25A does not come off from the U band 32.

Subsequently, if only the seat cushion 11 is rotated forward while the seat back 12 is in a standing state so that the state of the seat is changed from the tip-up state to the seatable state, the distance between the anchor 27A and the rear end of the seat cushion 11 is gradually decreased in contrast to the above description. Accordingly, the tongue piece 31 and the U band 32 are contracted due to their elasticity. While the tongue piece 31 and the U band 32 are contracted, the widths of the tongue piece and the U band are increased. When the seat cushion 11 returns to the seatable state, the buckle 25A is moved onto the seat cushion 11 by a contraction force. In this case, the surfaces of the tongue piece 31 and the U band 32 of which the widths are increased become receiving surfaces of the buckle 25A. The buckle 25A is guided by the receiving surfaces and moved onto the seat cushion 11.

If the seat cushion 11 drops on the lower floor 101 so that the state of the seat is changed from the seatable state to the dive-down state, the distance between the anchor 27A and the rear end of the seat cushion 11 is gradually increased. Even in this case, the operation is the same as described above. Further, even when the state of the seat is changed from the dive-down state to the tip-up state, the operation is the same as described above.

Figure 9:
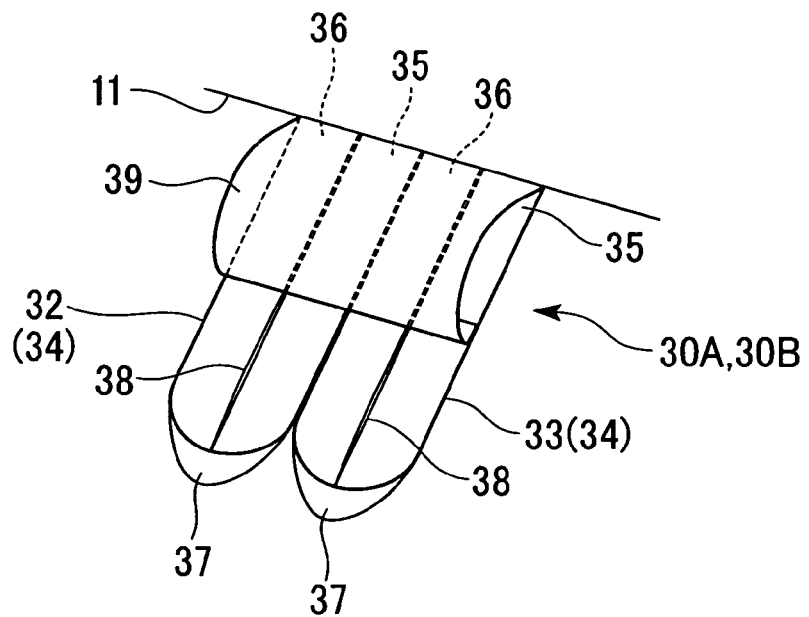
FIG. 9 is a perspective view of a buckle holder according to another embodiment.
Figure 10:
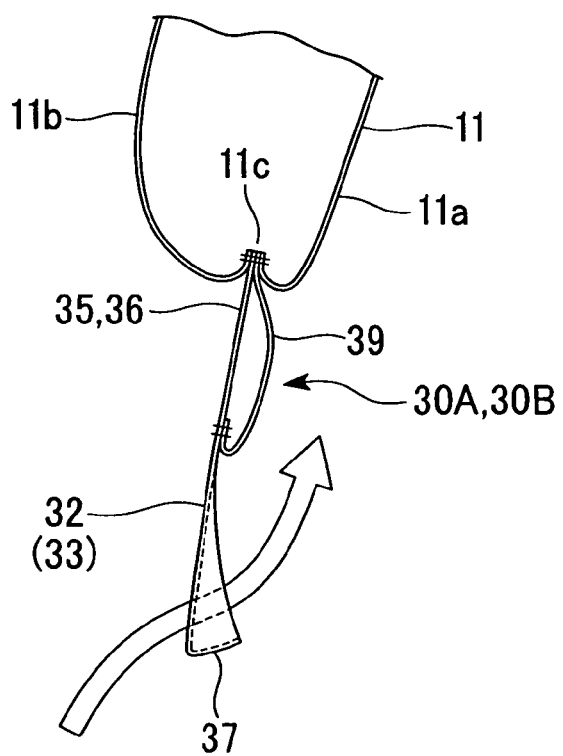
FIG. 10 is a side view of the buckle holder according to the another embodiment.

Next, buckle holders 30A and 30B according to another embodiment will be described with reference to FIGS. 9 and 10.

The buckle holders 30A and 30B according to this embodiment do not include tongue pieces 31, and the length of each of U bands 32 and 33 is larger than that of the above-mentioned embodiment by a length corresponding to the tongue piece. Both ends 35 and 36 of the U bands 32 and 33 are directly sewn on a suture 11c between a surface skin 11a and a bottom skin 11b of the rear end of a seat cushion 11. Further, a belt 39 made of a material, which has flexibility but does not have elasticity, (for example, cloth) is provided on the surfaces of the U bands 32 and 33. One end of the belt 39 is sewn on the suture 11c of the seat cushion 11 together with the both ends of the 35 and 36 of the U bands 32 and 33, while the other end of the belt 39 is sewn on substantially the middle portions of the U bands 32 and 33. Further, when the U bands 32 and 33 are not elongated, the belt 39 has a length causing slack.

The buckle holders 30A and 30B according to this embodiment have gaps 38, into which the buckles 28A to 28C are inserted, between the bands 34 and 34 of portions of the U bands 32 and 33 close to the folded portion 37 rather than the belt 39.

For example, a method of mounting the buckle 25A and the anchor belt 26A to the U band 32 of the buckle holder 30A is the same as that of the above-mentioned embodiment. The buckle 25A and the anchor belt 26A are inserted into the gap 38 of the U band 32 from the back surface to the front surface as shown in FIG. 10 with an arrow. In this case, the length of the U band 32 close to the folded portion 37 rather than the belt 39 is set so that the buckle 25A can be inserted into the gap 38 if the gap 38 is expanded against the elasticity of the U band 32 while the buckle 25A cannot be inserted into the gap 38 if the gap 38 is not expanded.

In the buckle holders 30A and 30B according to this embodiment, when the base portions of the U bands 32 and 33 are elongated, the lengths thereof are restricted so that the base portions are not elongated at a length or more of the belt 39. However, the portions of the U bands 32 and 33 close to the folded portion 37 rather than the belt 39 may be elongated regardless of the restriction of the lengths of the base portions.

In this embodiment, the surface of the belt 39 and the surfaces of the portion of the U bands 32 and 33 close to the folded portion 37 rather than the belt 39 become receiving surfaces of the buckles 25A to 25C. Like in the above-mentioned embodiment, when the state of the seat is changed from the tip-up state to the seatable state, the buckles 25A to 25C are guided by the receiving surfaces and moved onto the seat cushion 11.

Note that, the present invention is not limited to the above-mentioned embodiments.

For example, a pair of U bands has been provided for one buckle holder in the above-mentioned embodiments. However, one U band may be provided for one buckle holder.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A buckle holding structure for holding a buckle unit on a seat cushion, the buckle unit having: a belt of which one end is fixed to a vehicle body; and a buckle fixed to the other end of the belt, the buckle holding structure comprising:
   a band that has elasticity, has a predetermined width, and is folded in a U shape to form a folded portion, wherein both ends of the band are sewn on a surface skin of a rear end of the seat cushion so as to be disposed on the same plane in a width direction of the band;
   the belt of the buckle unit is inserted into a gap formed between both ends of the band, which is fixed to the rear end of the seat cushion, and the folded portion;
   the buckle is caught by the folded portion; and
   the band allows the seat cushion to rotate, with respect to the vehicle body, between a first position at which the band is elongated and a second position at which the band is contracted.

2. A buckle holding structure for holding a buckle unit on a seat cushion, the buckle unit having: a belt of which one end is fixed to a vehicle body; and a buckle fixed to the other end of the belt, the buckle holding structure comprising:

a band that has elasticity, has a predetermined width, and is folded in a U shape to form a folded portion; and a tongue piece that has elasticity and has a width larger than the width of the band, wherein both ends of the band are fixed to a rear end of the seat cushion so as to be disposed on the same plane in a width direction of the band;

the belt of the buckle unit is inserted into a gap formed between both ends of the band, which is fixed to the rear end of the seat cushion, and the folded portion;

the buckle is caught by the folded portion; and both ends of the band are fixed to the rear end of the seat cushion with the tongue piece interposed therebetween.

3. The buckle holding structure according to claim 2, wherein one end of the tongue piece is sewn with both a surface skin and a bottom skin of the seat cushion.

4. The buckle holding structure according to claim 2, wherein both ends of the band and one end of the tongue piece is sewn with both a surface skin and a bottom skin of the seat cushion.

5. A buckle holding structure for holding a buckle unit on a seat cushion, the buckle unit having: a belt of which one end is fixed to a vehicle body; and a buckle fixed to the other end of the belt, the buckle holding structure comprising:

a band that has elasticity, has a predetermined width, and is folded in a U shape to form a folded portion, wherein both ends of the band are fixed to a rear end of the seat cushion so as to be disposed on the same plane in a width direction of the band;

the belt of the buckle unit is inserted into a gap formed between both ends of the band, which is fixed to the rear end of the seat cushion, and the folded portion;

the buckle is caught by the folded portion; and a cloth having no elasticity is sewn on the surface of the band.

6. A vehicle seat having a buckle holding structure for holding a buckle unit, the buckle unit having: a belt of which one end is fixed to a vehicle body; and a buckle fixed to the other end of the belt, the vehicle seat comprising:

a seat cushion;

a seat back;

a rotary arm with which the seat cushion is rotatably connected to the seat back, the seat cushion being rotatable in a process of transferring between a seatable state and a tip-up state where the seat cushion rotates upward from the seatable state and overlaps the seat back being in a upright position; and an elastic band folded in a U shape to form a folded portion with both ends thereof being sewn on a surface skin of a rear end of the seat cushion to form a gap therebetween, the buckle unit being inserted into the gap, wherein the buckle is held at the folded portion when the seat cushion is in the tip-up state;

the elastic band draws the buckle onto the seat cushion in a process of transferring from the tip-up state to the seatable state; and the seat cushion is rotatable, with respect to the vehicle body, between the tip-up state at which the band is elongated and the seatable state at which the band is contracted.

7. The vehicle seat according to claim 6, further comprising a receiving surface which receives the buckle and is arranged between the rear end of the seat cushion and the folded portion.

8. The vehicle seat according to claim 7, wherein the receiving surface is formed by disposing both ends of the elastic band on the same plane in the width direction thereof, the elastic band having a predetermined width.

9. A vehicle seat having a buckle holding structure for holding a buckle unit, the buckle unit having: a belt of which one end is fixed to a vehicle body; and a buckle fixed to the other end of the belt, the vehicle seat comprising:

a seat cushion;

a seat back;

a rotary arm with which the seat cushion is rotatably connected to the seat back, the seat cushion being rotatable in a process of transferring between a seatable state and a tip-up state where the seat cushion rotates upward from the seatable state and overlaps the seat back being in a upright position;

an elastic band folded in a U shape to form a folded portion with both ends thereof being fixed to a rear end of the seat cushion to form a gap therebetween, the buckle unit being inserted into the gap;

a receiving surface which receives the buckle and is arranged between the rear end of the seat cushion and the folded portion; and a non elastic cloth which is fixed to the rear end of the seat cushion, with which the receiving surface is formed, wherein the buckle is held at the folded portion when the seat cushion is in the tip-up state; and the elastic band draws the buckle onto the seat cushion in a process of transferring from the tip-up state to the seatable state.

* * * * *